(12) United States Patent
Avigdor et al.

(10) Patent No.: US 6,173,303 B1
(45) Date of Patent: Jan. 9, 2001

(54) MULTIPLY CIRCUIT AND METHOD THAT DETECTS PORTIONS OF OPERANDS WHOSE PARTIAL PRODUCTS ARE SUPERFLUOUS AND MODIFIES PARTIAL PRODUCT MANIPULATION ACCORDINGLY

(75) Inventors: Yoram Avigdor, Kfar-Saba; Limor Levy, Kadima, both of (IL)

(73) Assignee: National Semiconductor Corp., Santa Clara, CA (US)

( * ) Notice: Under 35 U.S.C. 154(b), the term of this patent shall be extended for 0 days.

(21) Appl. No.: 09/187,204

(22) Filed: Nov. 6, 1998

(51) Int. Cl.⁷ .................. G06F 7/52; G06F 7/00

(52) U.S. Cl. ........................... 708/620; 708/525

(58) Field of Search ................... 708/490, 525, 708/495, 620

(56) References Cited

U.S. PATENT DOCUMENTS

| | | | |
|---|---|---|---|
| 4,276,607 | 6/1981 | Wong | 364/760 |
| 4,868,777 | 9/1989 | Nishiyama | 364/754 |
| 5,126,963 | 6/1992 | Fukasawa | 364/748 |
| 5,260,898 | * 11/1993 | Richardson | 708/490 |
| 5,262,973 | * 11/1993 | Richardson | 708/525 |
| 5,339,266 | * 8/1994 | Hinds et al. | 708/507 |
| 5,557,563 | 9/1996 | Larri | 364/754 |
| 5,586,069 | * 12/1996 | Dockser | 708/525 |
| 5,642,306 | 6/1997 | Mennemeier | 364/757 |
| 5,748,516 | * 5/1998 | Goddard et al. | 708/525 |

OTHER PUBLICATIONS

Chevillat et al, "Pipelined Hardward Multiplier with Extended Precision", IBM Tech. Discl. Bull. vol. 23 No. 9 Feb. 1981, pp. 4322–4323.*

* cited by examiner

Primary Examiner—Tan V. Mai
(74) Attorney, Agent, or Firm—Limbach & Limbach LLP

(57) ABSTRACT

Multiplication circuitry performs a multiply operation to multiply a multiplicand operand and a multiplier operand to form a total product of the multiplication operation, where the multiplier operand includes a plurality of multiplier operand portions. The multiplication circuitry includes multiplier circuitry configured to multiply each of the multiplier operand portions and the multiplicand operand, in a sequence, to form a sequence of partial products corresponding to the sequence of multiplier operand portions. The multiplier circuitry further includes combining circuitry configured, for each multiplier operand portion, to combine the partial product corresponding to that multiplier operand portion with a previous partial result, to generate a new partial result corresponding to that multiplier operand portion. Detection circuitry is configured to determine, for each multiplier operand portion and based on that multiplier operand portion, if the new partial result corresponding to that multiplier operand portion would not affect the final result of the multiplication. For example, the detection circuitry may be specifically configured to determine whether the multiplier operand portion is all zeros or all ones. Control circuitry is configured to control operations of the combining circuitry responsive at least to the determination of the detection circuitry for that multiplier operand portion.

8 Claims, 3 Drawing Sheets

| CYCLE | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| MULTIPLIER | MUL3 | MUL2 | | | | MUL1 | | | | MUL0 | | | | | |
| SHIFTER | | | SL3L | SR3H | SL2L | SR2H | | SL1L | | SR1H | | SL0L | | SR0H | |
| ALU | | | | | AD2L | | AD2H | | AD1L | | AD1H | | AD0L | | AD0H |

FIG. 3

| CYCLE | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| MULTIPLIER | MUL3 | | MUL2 | | | MUL1 | | | | MUL0 | | | | | |
| SHIFTER | | | SL3L | SR3H | | | | SL1L | | SR1H | | SL0L | | SR0H | |
| ALU | | | | | | | | | AD1L | | AD1H | | AD0L | | AD0H |

FIG. 4

MULTIPLY CIRCUIT AND METHOD THAT DETECTS PORTIONS OF OPERANDS WHOSE PARTIAL PRODUCTS ARE SUPERFLUOUS AND MODIFIES PARTIAL PRODUCT MANIPULATION ACCORDINGLY

TECHNICAL FIELD

The present invention relates to multiplier circuits and, in particular, to a multiplier circuit that eliminates partial product combination operations where it is detected that those operations will not affect a final result of the multiplication.

BACKGROUND

Multiplication is one of the most time-consuming arithmetic operations for a processor to perform. As a result, much effort has been expended at making the multiplication operation more efficient. In many instances, the success of a particular effort has been measured by determining if it results in an acceptable tradeoff between the number of clock cycles required to execute a multiply operation, versus the amount of hardware required to implement the execution. For example, a 16-bit by 16-bit multiply instruction can be executed in one clock cycle (or a small number clock cycles, accounting for instruction execution overhead) if a 16×16 hardware multiplier is used, but the same instruction will take more clock cycles if a smaller multiplier is used.

Other approaches have been taken as described, for example, in U.S. Pat. Nos. 5,557,563 and 4,276,607. The disclosures of these patents are summarily described here and, for full details, the reader is referred directly to their disclosures.

U.S. Pat. No. 5,557,563 to Larri et al. describes a processor circuit that terminates a multiply instruction based on the one of the input operands being small, limiting the number of bits of the result. The circuit described by Larri et al. can terminate the multiply operation after one, two, three or four iterations of the multiplier core. See, e.g., col. 5, lines 57–58.

U.S. Pat. No. 4,276,607 to Wong describes a processor circuit that detects trailing zeros in a multiplier operand, and performs the multiplication operation only beginning with that word which is the lowest order word having a non-zero content.

What is desired is a circuit and method that can further reduce the number of clock cycles (or, at least, the average number of clock cycles) of a processor required to perform a multiply instruction.

SUMMARY

In accordance with the invention, multiplication circuitry is provided to perform a multiply operation to multiply a multiplicand operand and a multiplier operand to form a total product of the multiplication operation, where the multiplier operand includes a plurality of multiplier operand portions. The multiplication circuitry includes multiplier circuitry configured to multiply each of the multiplier operand portions and the multiplicand operand, in a sequence, to form a sequence of partial products corresponding to the sequence of multiplier operand portions. The multiplier circuitry further includes combining circuitry configured, for each multiplier operand portion, to combine the partial product corresponding to that multiplier operand portion with a previous partial result, to generate a new partial result corresponding to that multiplier operand portion. Detection circuitry is configured to determine, for each multiplier operand portion and based on that multiplier operand portion, or on both that and the previous multiplier operand portions if the new partial result corresponding to that multiplier operand portion would not change the previous partial result corresponding to a previous multiplier operand portion. For example, the detection circuitry may be specifically configured to determine whether the multiplier operand portion is all zeros or all ones. Control circuitry is configured to control operations of the combining circuitry responsive at least to the determination of the detection circuitry for that multiplier operand portion.

BRIEF DESCRIPTION OF FIGURES

FIG. 3 is a timeline illustrating how operations of the FIGS. 1 and 2 data path may occur.

FIG. 4 is an example of how the FIG. 3 timeline may be modified if the FIG. 2 detection logic detects that nibble 2 only, of a four nibble multiplier operand, is all zero.

DETAILED DESCRIPTION

Figure 1:
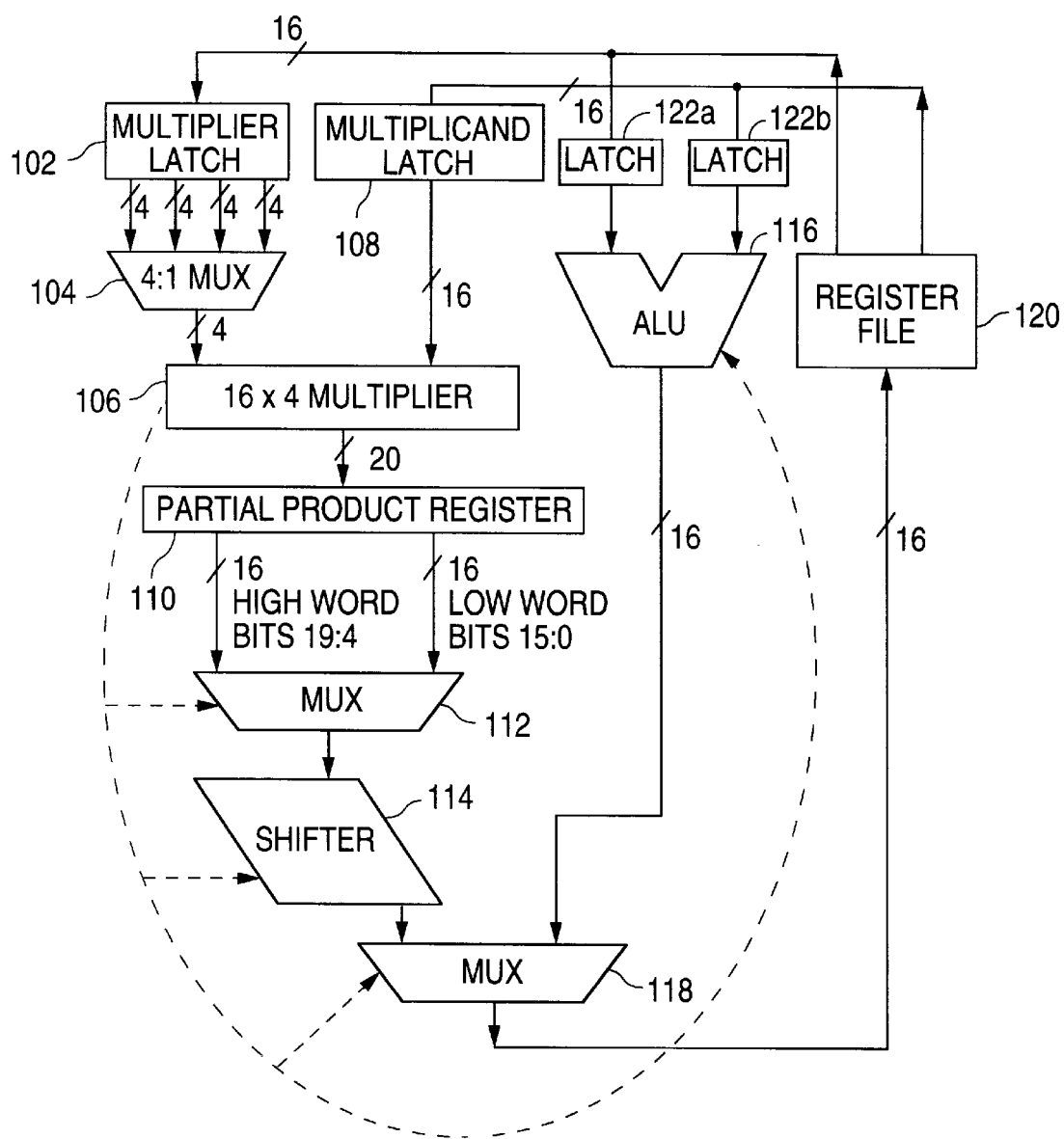
FIG. 1 is a block illustration of the data path for a multiply operation.

FIG. 1 illustrates, in block form, a data-path representation of a circt 100 of a 16×16 multiply operation in accordance with an embodiment of the present invention. It should be noted that the invention is particularly applicable to signed multiplication (e.g., multiplication of operands that are in a two's complement binary form). As can be seen from FIG. 1, a multiplier latch 102 in conjunction with a 4:1 multiplexor 104 selectively provides portions (in this case, 4-bit portions—or "nibbles") of the multiplier operand to a 16×4 multiplier circuit 106. The multiplier circuit 106 performs four multiply operations, each time multiplying together the 16-bit multiplicand operand (provided from a multiplicand latch 108) with a separate nibble of the multiplier operand to generate four separate corresponding partial products. Each partial product is 20 bits and is stored into a partial product register 110. For example, if the nibbles of the multiplier operand are nibble 0, nibble 1, nibble 2 and nibble 3 (with nibble 0 being the least significant nibble) then the resulting partial products are PP0, PP1, PP2 and PP3, respectively.

The four resulting 20-bit partial products are provided from the partial product register 110, via a multiplexor 112, to a shifter 114. Specifically, the 20-bit partial products are provided to the shifter 114 in two overlapping parts—the lower-16-bits (bits 15:0, or "Low-Word") and the higher-16-bits (bits 19:4, or "High-Word").

Figure 2:
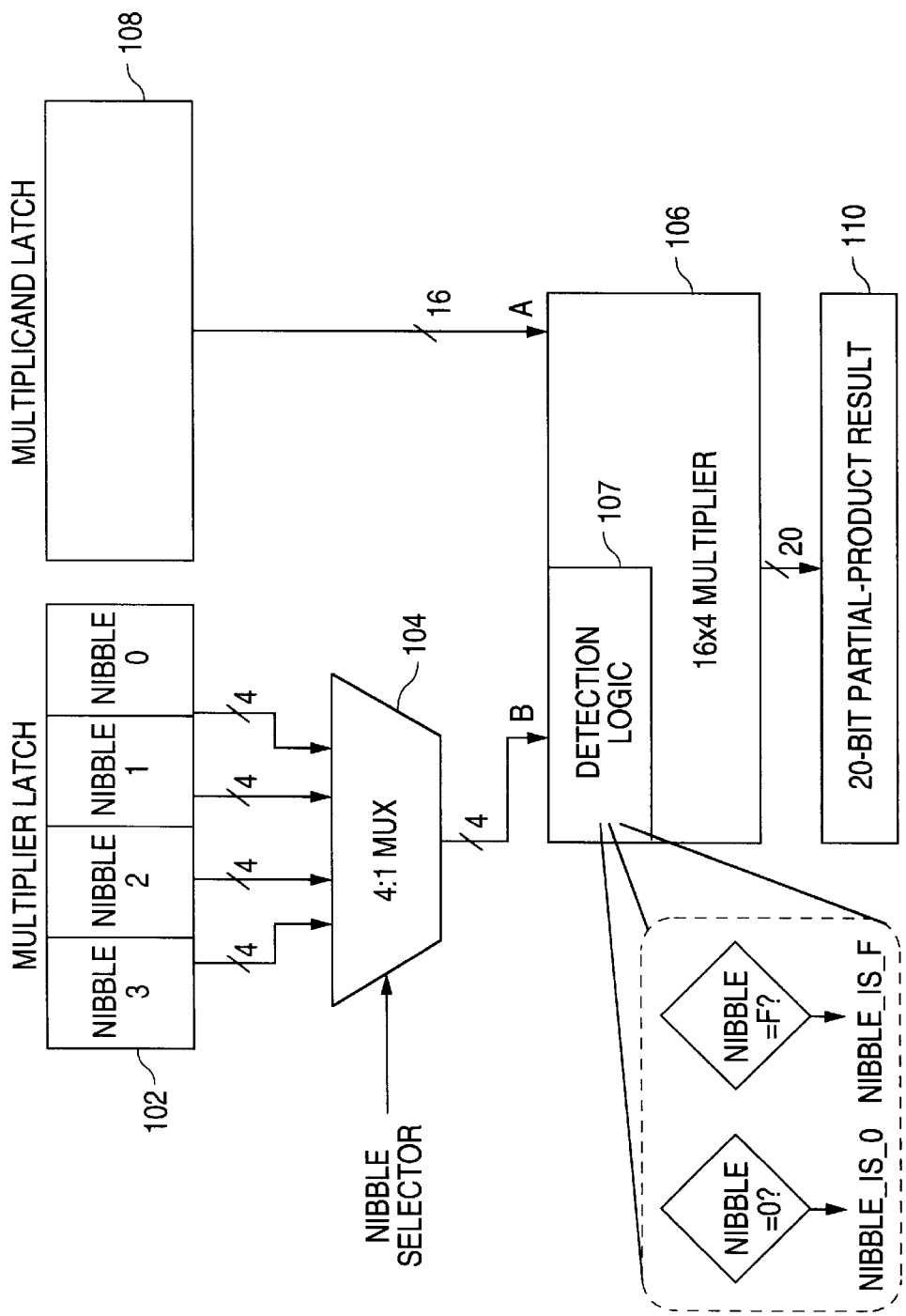
FIG. 2 is a block diagram illustrating a portion of the FIG. 1 data path in accordance with an embodiment of the invention.

As can be seen from FIG. 2, the 16×4 multiplier circuit 106 includes detection logic 107 that detects whether each nibble of the multiplier operand has a particular state—namely, in the illustrated embodiment, all 0's (nibble_is_0) and all 1's (nibble_is_F). As is discussed in greater detail below, bit manipulation circuitry of the circuit 100 can be instructed to operate in a particular fashion when the nibble of the multiplier operand has particular states. It should be noted that, while FIG. 2 shows the detection logic 107 being part of the multiplier, this is not a requirement. In particular, if one or more nibbles of the multiplier operand are detected to have a state that would make one or more of the shift or ALU operations superfluous, then, in accordance with the illustrated embodiment of the invention, the superfluous operations are skipped. As a result, the multiplication of multiplier operands with nibbles having such states is streamlined.

Turning back to FIG. 1, the "bit manipulation circuitry" is discussed In implementation of at least some conventional multiplication algorithms, the shifter unit 114 and arithmetic logic unit 116 (in conjunction with various multiplexors, latches and register files—such as multiplexor 118, register file 120 and latches 122a and 122b) would perform the add, shift and multiply operations in a pipeline fashion, as shown in the example of FIG. 3. In FIG. 3, the following shorthand operation notation is used. (It should be noted that the number used in conjunction with the shorthand notation relates to the particular nibble being operated upon, and the corresponding partial product.) SR=Shift Right; SL=Shift Left; AD=Add; L=Low Word; and H=High Word.

Now, the detected conditions under which superfluous operations are skipped is discussed with reference to the disclosed embodiment. It should be noted that detection by the detection logic 107 is nibble-by-nibble. If the detection logic 107 determines that nibble 3 of the multiplier operand is all zeros (indicated by "nibble_is_0" in FIG. 2 being TRUE for nibble 3), while multiplying nibble 3 of the multiplier operand with the multiplicand operand, then certain of the shift and add operations shown in FIG. 3 are omitted. Specifically, the operations of SL3L and SR3H are skipped. Because the SL3L operation is the only operation in cycle 2 of the FIG. 3. operation, cycle 2 can be skipped.

If the detection logic 107 determines that nibble 2 of the multiplier operand is all zeros (as indicated by "nibble_is_0" in FIG. 2 being TRUE for nibble 2), while multiplying nibble 2 of the multiplier operand with the multiplicand operand, the operations of SL2L, AD2L, SR2H, and AD2H are cancelled. Cycles 4, 5, and 7 are skipped.

If the detection logic 107 determines that nibble 1 of the multiplier operand is all zeros (as indicated by "nibble_is_0" in FIG. 2 being TRUE for nibble 1), while multiplying nibble 1 of the multiplier operand with the multiplicand operand, the operations of SL1L, AD1L, SR1H, and AD1H ar cancelled. Cycles 8, 9, and 11 are skipped.

If the detection logic 107 determines that nibble 0 of the multiplier operand is all zeros (as indicated by "nibble_is_0" in FIG. 2 being TRUE for nibble 0), while multiplying nibble 0 of the multiplier operand with the multiplicand operand, the operations of SL0L and SR0H are cancelled. Cycles 12 and 14 are skipped.

If the detection logic 107 determines that nibble 3 of the multiplier operand is all ones (indicated by "nibble_is_F" in FIG. 2 being TRUE), while multiplying nibble 3 of the multiplier operand with the multiplicand operand, the operations of SL3L and SR3H are cancelled. Cycle 2 is skipped.

If the detection logic 107 determines that nibble 2 of the multiplier operand is all ones (indicated by "nibble_is_F" in FIG. 2 being TRUE for nibble 2), while multiplying nibble 2 of the multiplier operand with the multiplicand operand, the operations of SL2L, AD2L, SR2H and AD2H (cycles 4, 5 and 7) are cancelled only if "nibble_is_F" was TRUE for nibble 3 also.

If the detection logic 107 determines that nibble 1 of the multiplier operand is all ones (indicated by "nibble_is_F" in FIG. 2 being TRUE for nibble 1), while multiplying nibble 1 of the multiplier operand with the multiplicand operand, the operations of SL1L, AD1L, SR1H and AD1H (cycles 8, 9 and 11) are cancelled only if "nibble_is_F" was TRUE for nibble 3 and nibble 2 also.

Finally, if the detection logic 107 determines that nibble 0 of the multiplier operand is all ones (indicated by "nibble_is_F" in FIG. 2 being TRUE for nibble 0), while multiplying nibble 0 of the multiplier operand with the multiplicand operand, the operations of SL0L and SR0H (cycles 12 and 14) are cancelled only if "nibble_is_F" was true for nibble 3, nibble 2 and nibble 1 also.

It should be noted that the "nibble_is_F" indication only applies if the multiplier operand is in a signed representation where the sign of the multiplier operand is extended (e.g., two's complement notation).

It can be seen that, in accordance with the present invention, cycle saving is not limited to "small" operands. Using the described embodimen as an example, cycles can be saved for a nibble of a multiplier operand whose corresponding partial product is redundant, even if that nibble is not in the most significant part of the multiplier operand. Put another way, for an unsigned four nibble multiplier operand that has a most significant bit of 1 with the rest of its bits being all zero, the circuit described by U.S. Pat. No. 5,557,563 would not save any cycles. By contrast, the described embodiment would save cycles in this instance for each of the three least significant nibbles. Thus, it can be seen that the circuit 100, embodying the described detection logic 107 and control logic, is more versatile than the circuit described in U.S. Pat. No. 5,557,563 and saves processor clock cycles in more situations than that circuit.

It should be understood that various alternatives to the embodiments of the invention described herein may be employed in practicing the invention. It is intended that the following claims define the scope of the invention and that structures within the scope of these claims and their equivalents be covered thereby.

What is claimed is:

1. Multiplication circuitry to perform a multiply operation to multiply a multiplicand operand and a multiplier operand to form a total product of the multiplication operation, the multiplier operand including a plurality of multiplier operand portions, the multiplication circuitry including:

multiplier circuitry configured to multiply each of the multiplier operand portions and the multiplicand operand, in a sequence, to form a sequence of partial products corresponding to the sequence of multiplier operand portions;

combining circuitry configured, for each multiplier operand portion, to combine the partial product corresponding to that multiplier operand portion with a previous partial result, to generate a new partial result corresponding to that multiplier operand portion;

detection circuitry configured to determine, for each multiplier operand portion and based on that multiplier operand portion, if the new partial result corresponding to that multiplier operand portion would not differ from a previous partial result corresponding to a previous multiplier operand portion; and control circuitry, configured to control operations of the combining circuitry responsive at least to the determination of the detection circuitry for that multiplier operand portion.

2. The multiplication circuitry of claim 1, wherein the multiplier circuitry is configured to form the partial product corresponding to each multiplier operand portion without regard to a result of the determination by the detection circuitry for that multiplier operand portion.

3. The multiplication circuitry of claim 2, wherein each multiplier operand portion is a nibble.

4. The multiplication circuitry of claim 2, wherein the detection circuitry includes determining circuitry configured to determine whether that multiplier operand portion has a particular condition.

5. The multiplication circuitry of claim 4, wherein the particular condition is a first particular condition, and the determination by the detection circuitry for that multiplier operand portion further includes determining whether at least one particular prior multiplier operand portion in the multiplier operand portion sequence has a second particular condition.

6. The multiplication circuit of claim 5, wherein the second particular condition is the same as the first particular condition.

7. The multiplication circuitry of claim 6, wherein the first particular condition is that the present multiplier operand portion is all zeros.

8. The multiplication circuitry of claim 6, wherein the first particular condition and the second particular condition is that the present multiplier operand portion is all ones and all previous multiplier operand portions are all ones.

* * * * *